---

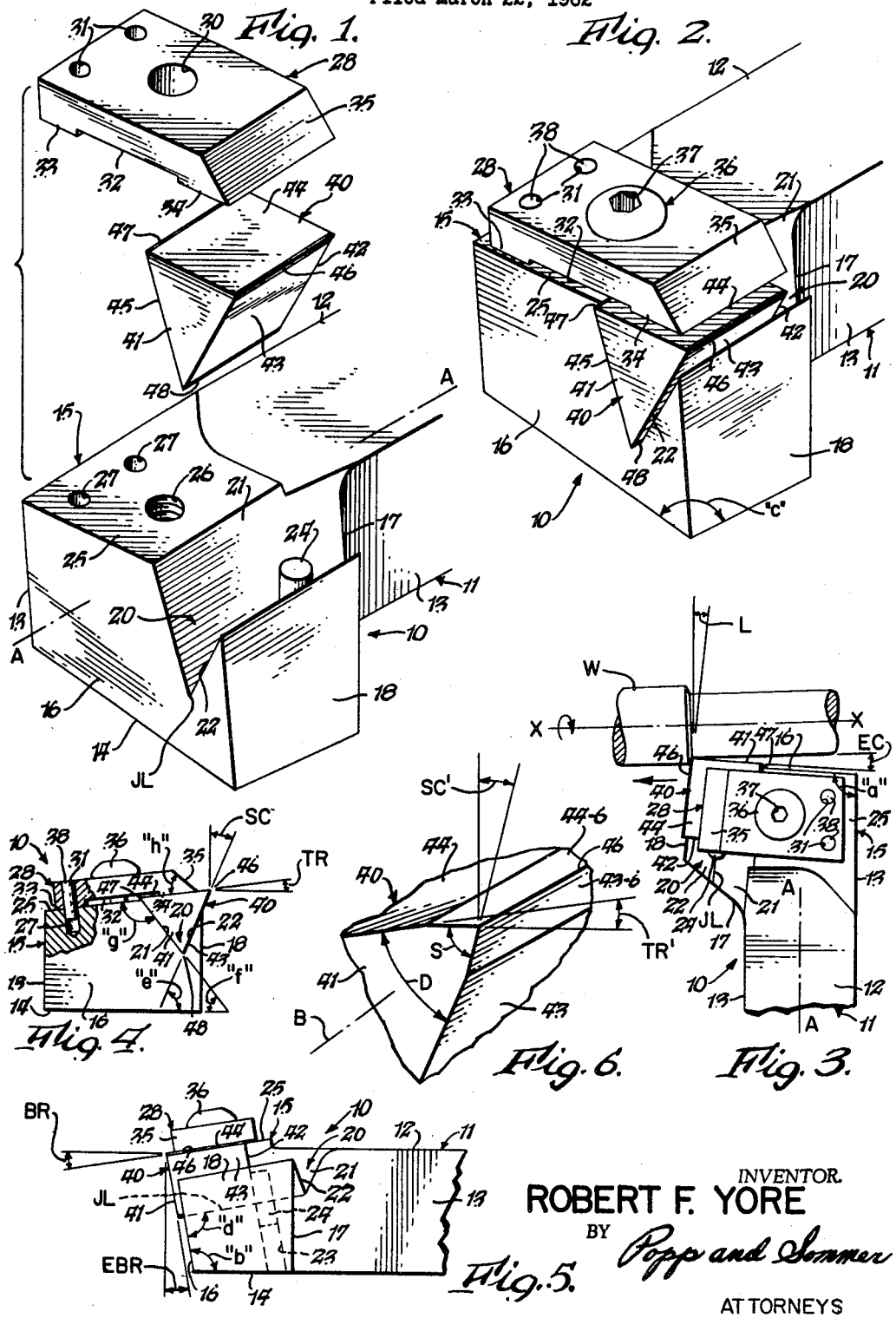

United States Patent Office 3,191,261
Patented June 29, 1965

---

3,191,261
CUTTING TOOLS
Robert F. Yore, 212 Dalton Ave., Tonawanda, N.Y.
Filed Mar. 22, 1962, Ser. No. 181,706
8 Claims. (Cl. 29—96)

This invention relates to improvements in cutting tools, such as a turning tool, and more particularly to a new and improved cutting bit, and a new and improved holder therefor.

In the manufacture of such turning tools, it is now common practice to employ indexible and removable cutting bits in the form of rectangular or triangular disks made of hard, wear-resistant composition, such as tungsten carbide. It is also conventional to machine the bit-receiving recess out of the bit holder in order to provide the desired bit back-up surfaces as well as the back and top (side) rakes.

However, the initial cost of machining these bit back-up surfaces in such conventional holders is high because their design inherently requires numerous and complex machining operations. In addition, it is not feasible to harden and grind these back-up surfaces because they are not readily accessible for such operations. Accordingly, it is necessary to provide shims or platforms made of carbide to support the disk-shaped bits. Moreover, these conventional tools also require unduly complex bit clamping and locating devices. All of these requirements unnecessarily increase the cost of manufacturing such tools.

While the provision of back and top rake angles on a conventional bit supporting body reduces the amount of grinding of the bit and permits the same to be indexible, such tools are inherently limited to the particular top rake and side clearance angles formed in the supporting body. If any substantial change is required in this top rake angle, it is necessary to provide a separate tool. Furthermore, should it be necessary to vary the side clearance angle of the tool, this requires grinding of the entire narrow side faces of the cutting disks and does not permit the same to be reversed. Thus, in a triangular disk-shaped bit, for example, instead of having the desired six cutting edges, only three of these edges can be used.

Accordingly, it is the primary object of the present invention to provide improvements in such cutting tools, which improvements not only permit the use of removable and indexible cutting bits and the machining of the desired top and back rakes on the bit supporting body, but also substantially decrease tool manufacturing costs by reducing both the number and complexity of the machining operations required to produce the bit back-up surfaces, by making such surfaces readily available for hardening and grinding to eliminate the necessity for carbide shims or platforms, and by greatly simplifying the bit clamping and locating arrangements.

A specific primary object is to provide a new and improved cutting bit holder which is so constructed and designed as to vary the geometry of the following values for a cutting bit of given design: (1) lead angle of the cutting edge, (2) end back relief angle, (3) end clearance angle, (4) primary side clearance angle, (5) primary top rake angle, and (6) back rake angle.

Another specific primary object is to provide a new and improved cutting bit which is so constructed and designed as to vary the geometry of the following values for a cutting bit holder of given design: (1) secondary or effective side clearance angle and (2) secondary or effective top rake angle, and thereby facilitate proper application and accurate adjustment of these two variables for the particular cutting operation.

Another object is to provide a new and improved cutting bit holder which is so constructed and designed as to provide close control over chip formation to suit the machining conditions and the physical properties of the material being machined.

Still another object is to provide a new and improved cutting bit of generally triangular cross section which is not only indexible, but also reversible end for end to permit use of all of its cutting edges.

Other objects and advantages of the invention will become apparent upon a consideration of the following detailed description together with the accompanying drawing wherein:

FIG. 1 is an exploded partial front perspective view of a turning tool including a bit holder and cutting bit each constituting a preferred embodiment of the invention;

FIG. 2 is a view similar to FIG. 1, but illustrating the bit as clamped in the holder;

FIG. 3 is a partial top plan view on a reduced scale of the turning tool illustrated in FIGS. 1 and 2 in typical operative relationship with a workpiece;

FIG. 4 is a front elevational view of the tool illustrated in FIG. 3, with a portion of the bit holder being broken away in section;

FIG. 5 is a partial side elevational view of this tool, and

FIG. 6 is an enlarged fragmentary front perspective view of a cutting edge portion of the bit, illustrating the formation of a cutting edge thereon.

Referring to the drawing, and particularly FIGS. 1 and 2, a cutting bit holder constituting a preferred embodiment of the invention is generally indicated at 10, the various parts thereof preferably being made of suitable steel. The holder includes an elongated bit supporting body 11 of generally rectangular cross section, having a central longitudinal axis A—A, and provided with a top 12, sides 13 and a base 14. This body also includes an offset end portion 15 provided with a front lateral surface 16 and a rear lateral surface 17 connected by a longitudinal side surface 18. The end portion 15 is cut away to form a bit receiving recess 20 of uniform 60° V-shaped cross section, this recess being defined by two bit back-up surfaces 21 and 22 extending longitudinally from front surface 16 to rear surface 17 and intersecting along a juncture line JL (as also seen in FIG. 5), the back-up surface 22 extending laterally to surface 18. Along the juncture line JL and adjacent rear surface 17, recess 20 is provided with a generally upright opening 23 adapted to receive a bit locating pin 24 force fit therein. As best seen in FIG. 5, opening 23 preferably extends through to base 14 in order to permit ready removal of pin 24.

End portion 15 is also cut away to provide a clamping surface 25 extending longitudinally from front surface 16 to top 12 and laterally from far side 13 to back-up surface 21. Clamping surface 25 is provided with an enlarged threaded opening 26, and a pair of longitudinally spaced smaller openings 27, one being shown in section in FIG. 4.

As will be evident, it is but a simple matter to machine the recess 20 and clamping surface 25, as there are no obstructions to the cutting of either the recess or the clamping surface. Moreover, it will be evident that the surfaces may readily be ground and hardened because of their accessibility for such operations.

The bit holder 10 also includes means for clamping the bit in the recess 20, this means preferably taking the form of a clamping plate 28 having an enlarged opening 30 mating with opening 36 and two smaller openings 31 mating with openings 27. The base of clamping plate 28 is provided with a central through recess 32 terminating in a rear foot 33 adapted to engage clamping surface 26 and a front foot 34 adapted to extend over recess 20 and engage the cutting bit, while the front end of the plate is provided with a suitably inclined chip-breaking surface 35 for proper control of chip formation. The plate 28 is readily secured to clamping surface 25 by a bolt 36, the threaded stem portion of which extends freely through opening 30 into threaded engagement with the threads of opening 26, and the enlarged head portion of which engages the upper surface of the plate 28, this head portion being provided with a hexagonal recess 37 for the usual tightening wrench (not shown). As will be apparent, the engagement between the head portion of bolt 36 and plate 28 will spring the plate into secure engagement with both the clamping surface 25 and the bit. In order to prevent the clamping plate 28 from cocking about bolt 36, pins 38 are provided to extend freely through openings 31 in the plate and to be press fit into openings 27.

A preferred embodiment of the inventive cutting bit is generally indicated at 40 and is preferably made of a hard, wear-resistant composition, such as tungsten carbide. The bit 40 is in the form of a prism, being provided with equilateral triangular end faces 41, 42 connected by rectangular side faces 43, 44 and 45 defining primary acute included angles P of 60° on the end faces, as best seen in FIG. 6. All of these primary side faces are severally cut away an equal amount along their junctures to form pairs of secondary side faces defining cutting edges 46, 47 and 48 extending from end face 41 to end face 42. As shown in detail in FIG. 6, the two primary side faces 43 and 44 are cut away an equal amount to form the secondary side faces 43–6 and 44–6 to define the cutting edge 46 and a secondary included angle S on both end faces 41 and 42 (not shown) greater than the corresponding primary angle P, the cutting edge 46 being located on the perpendicular bisector B of primary side face 45 (not shown). As will be explained more in detail below, the formation of the secondary side faces is designed to vary and to provide a vernier or fine adjustment of the top rake angle TR and side clearance angle SC (FIG. 4) by forming a secondary or effective top rake angle TR' and a secondary or effective side clearance angle SC' (FIG. 6).

While only the primary side faces 43 and 44 are illustrated in FIG. 6 as being cut away to form the secondary side faces 43–6 and 44–6, it will be apparent from FIGS. 1 and 2 that each of the side faces are similarly cut away along their junctures so that the bit is not only indexible from one cutting edge to the other, but is also reversible end for end.

In assembling the inventive tool 10, the bit 40 is shown as being arranged and located longitudinally in recess 20 with end face 41 extending transversely of the recess 20 adjacent to and protruding slightly beyond front surface 16, end face 42 engaging pin 24, side faces 43, 45 being supported by back-up surfaces 22, 21 respectively, side face 44 being engaged by foot 34 of clamping plate 28, and cutting edge 46 being arranged adjacent to and protruding above and beyond the juncture of back-up surface 22 and longitudinal surface 18. In view of the indexibility and reversibility of the bit 40, it is evident that either end face may be located adjacent front surface 16 and any side face may be located adjacent any one of either back-up surface or foot 34.

In order to form the desired lead angle L, end clearance angle EC, end back relief angle EBR, and back rake angle BR, all as illustrated in FIGS. 3 and 5, the offset end portion 15 of holder 10 is so constructed that front surface 16 makes an obtuse included angle "a" with far side 13 (FIG. 3) an obtuse included angle "b" with base 14 (FIG. 5), and a right angle "c" with longitudinal surface 18 (FIG. 2), while V-shaped recess 20 is cut so that juncture line JL extends parallel to longitudinal surface 18 (FIG. 3), and lies perpendicular to front surface 16 (FIG. 5). The primary top rake angle TR and primary side clearance angle SC, as illustrated in FIG. 4, are obtained by cutting recess 20 so that back-up surface 22, which joins longitudinal surface 18 preferably below the juncture of clamping surface 25 and back-up surface 21, makes an acute included angle "e" with base 14 and back-up surface 21 makes preferably an acute included angle "f" with the base. In the particular embodiment illustrated, the desired angular disposition of the back-up surfaces is obtained by rotating the recess 20 about juncture line JL in a counter-clockwise direction to make angle "e" greater than angle "f," and thereby provide a primary positive top rake TR for the bit 40. However, it will be apparent that the recess 20 could be cut to provide either a neutral primary top rake ("e"="f") or a negative top rake ("e"<"f"), if so desired. Finally, the clamping surface 25 is cut to make an included obtuse angle "g" (FIG. 4) with back-up surface 21 and to extend longitudinally parallel with juncture line JL (FIG. 5), and thereby locate the clamping surface 25 parallel to side face 44 for facilitating the placement and securement of clamping plate 28, while the chip-breaking surface 35 makes the desired acute included angle "h" (FIG. 4) with the base of plate 28 for proper control of chip formation.

As shown in FIG. 3, the inventive turning tool 10 is designed to be fed into the workpiece W to be turned, as the latter rotates about its axis X–X in a clockwise direction (as seen from the left end of W) toward the tool 10 as indicated by an arrow, the direction of cut or tool travel being from right to left, as also indicated by an arrow. Thus, the portion of cutting edge 46 adjacent end face 41 is performing the actual cutting operation, with the side face 43 functioning as the lead face, and the side face 44 functioning as the trailing face over which the chips (not shown) pass, to be broken up by the chip breaking surface 35. Should the portion of the cutting edge 46 being used become dull, it is but a simple matter to index the bit 40 to place the edges 47 and 48 in the desired cutting position, and when these edges are used up adjacent the front end face 41 of the bit, then the bit may readily be reversed end for end, to use a total of six cutting edges.

Assuming, as illustrated in FIG. 4, that the bit 40 is located in recess 20 so as to provide a positive primary top rake TR and a certain primary side clearance SC, it is readily apparent that these two variables may be changed and finely adjusted with respect to each other merely by cutting away the primary side faces 43 and 44 on bit 40, as illustrated in FIG. 6. In one instance, the secondary side faces, such as 43–6 and 44–6, may be designed to reduce the amount of positive top rake, whereas in another instance, they may be designed to change from a positive top rake to a negative top rake, with the appropriate reduction in the primary side clearance in each case, the effective top rake and side clearance being determined by the secondary angles TR' and SC' respectively. Thus, in one tool, these two variables may readily be adjusted for the particular machining conditions and physical properties of the material being machined, there being no necessity to use separate tools for each particular type of machining operation.

In order to highlight, but not restrict the invention, the following specific example is given. In a typical embodiment, such as the one illustrated, the lead angle L (FIG. 3) and end clearance angle EC ($L=EC$ for most machining operations) may vary from about 3 degrees to about 50 degrees, with the preferred range being from about 10 degrees to about 15 degrees, while the minimum end back relief angle EBR (FIG. 5) should be about 20 degrees, which makes the back rake angle BR the same value negative, because of the geometry of the offset end portion. At the same time, the minimum effective side clearance SC' (FIG. 6) employed should be about 20 degrees while the effective top rake TR' may vary from about 20 degrees positive to about 40 degrees negative, with the preferred range being from about 10 degrees positive to about 10 degrees negative. The use of such larger side clearance, compared to the 5 to 7 degrees normally employed, together with the broad range of top rake from negative to positive in one tool, results in significantly more efficient and effective machining over a wide variety of operations.

While the meanings of the various clearance, relief and rake angles referred to herein are well known in the art, the following definitions are given for clarity.

Lead, such as L (FIG. 3), is the angle between the cutting edge, such as 46, and a line parallel to the longitudinal axis, such as A–A, of the bit supporting body, measured in a plane parallel to the base, such as 14, of such body.

End clearance, such as EC (FIG. 3), is the angle between the front end face, such as 41, of the bit and a line parallel to the axis, such as X–X of the work, measured in a plane parallel to the base, such as 14, of the bit supporting body.

End back relief (also referred to as front clearance), such as EBR (FIG. 5), is the angle between the front end face, such as 41, of the bit and a line perpendicular to the base, such as 14, of the bit-supporting body, measured in a plane perpendicular to the base, such as 14, of the body.

Back rake, such as BR (FIG. 5), is the angle between the cutting edge, such as 46, and a line parallel to the longitudinal axis, such as A–A of the bit supporting body, measured in a plane perpendicular to the base, such as 14, of the body. If the cutting edge, such as 46, slopes upwardly away from the work, such as W, the rake is negative; if the cutting edge slopes upwardly toward the work, the rake is positive, and if the cutting edge is parallel to the base of the body the rake is zero or neutral.

Side clearance, such as SC (FIG. 4), is the angle between the leading side face, such as 43, of the cutting bit and a line perpendicular to the base, such as 14, of the bit supporting body, measured in a plane perpendicular to the base. This is the same as primary side clearance as used herein. Effective or secondary side clearance, is measured in the same manner, but using the secondary leading side face, such as 43–6, instead of the primary leading side face, such as 43.

Top rake (also referred to as side rake), such as TR (FIG. 4), is the angle between the trailing side face, such as 44, of the cutting bit and a line parallel to the base, such as 14, of the bit supporting body, measured in a plane perpendicular to the base. This is the same as primary top rake, as used herein. Effective or secondary top rake is measured in the same manner, but using the secondary trailing side face, such as 44–6, instead of the primary trailing side face, such as 44. The top rake is positive if the trailing face slopes downwardly away from the direction of cut or tool travel; negative if the slope is reversed, and neutral or zero if the trailing face is parallel to the base.

From the foregoing, it will be seen how the invention accomplishes its various objects, and the various advantages of the invention will also be apparent. For example, the inventive tool is quite versatile in being adapted for use in machining a wide variety of materials, including the various metals, carbides, ceramics, and exotic (such as chromium tungsten alloys), especially because of the ready changeability and fine adjustment of the top rake TR and side clearance SC angles. Likewise, the inventive tool is efficient because all of the cutting edges of the bit are useable. In addition, the tool is economical to manufacture, the machining of the back-up surfaces and clamping surface being simplified, as well as the bit locating and clamping arrangements, and the grinding and hardening of such back-up and clamping surfaces being made feasible.

While the invention has been described and illustrated herein with respect to a certain preferred embodiment, it will be apparent that various changes and modifications may be made therein without departing from the spirit of the invention, the scope of which is determined by the appended claims.

What is claimed is:

1. An indexible prismatic cutting bit having equilateral triangular end faces connected by elongated rectangular side faces defining primary included angles on said end faces, a pair of said side faces being cut away along their juncture to define a cutting edge extending from one toward the other of said end faces and a secondary included angle on said one end face greater than the corresponding one of said primary angles, for varying the effective side clearance and/or top rake angles for a holder of given design.

2. An indexible and reversible prismatic cutting bit having equilateral triangular end faces connected by elongated rectangular primary side faces defining primary included angles on said end faces, a pair of said primary side faces severally being cut away an equal amount along their juncture to form a pair of secondary side faces defining a cutting edge located on the perpendicular bisector of the remaining one of said primary side faces and extending from one to the other of said end faces and secondary included angles on said end faces greater than the corresponding ones of said primary angles, for varying the effective side clearance and top rake angles for a holder of given design.

3. An indexible prismatic cutting bit having equilateral triangular end faces connected by elongated rectangular side faces defining primary included angles on said end faces, all of said side faces severally being cut away along their junctures to define cutting edges extending from one toward the other of said end faces and secondary included angles on said one end face greater than the corresponding ones of said primary angles, for varying the effective side clearance and/or top rake angles for a holder of given design.

4. An indexible and reversible prismatic cutting bit having equilateral triangular end faces connected by elongated rectangular primary side faces defining primary included angles on said end faces, all of said primary side faces severally being cut away an equal amount along their junctures to form pairs of secondary side faces defining cutting edges severally located on the perpendicular bisectors of the opposite ones of said primary side faces and extending from one to the other of said end faces and secondary included angles on said end faces greater than the corresponding ones of said primary angles, for varying the effective side clearance and top rake angles for a holder of given design.

5. In a turning tool, the combination comprising an indexible prismatic cutting bit and a holder therefor; said bit having equilateral triangular end faces connected by elongated rectangular side faces defining primary included angles on said end faces, a pair of said side faces being cut away along their juncture to define a cutting edge extending from one toward the other of said end faces and a secondary included angle on said one end face greater than the corresponding one of said primary angles, for varying the effective side clearance and/or top rake angles for said holder; said holder comprising an elongated bit supporting body of generally polygonal cross section including an offset end portion having lateral front and rear surfaces connected by a longitudinal side surface, said end portion being cut away to form a V-shaped, bit receiving recess and a bit clamping surface, said recess being defined by two intersecting bit back-up sufaces extending longitudinally of said body from said front surface to said rear surface, said clamping surface extending longitudinally of said body from said front surface and laterally of said body to one of said back-up surfaces, and the other of said back-up surfaces extending laterally of said body to said longitudinal surface; said bit being arranged in said recess with said one end face extending transversely of said recess adjacent said front surface, the remaining one of said side faces supported by said one back-up surface, and said cutting edge adjacent the juncture of said other back-up surface and said longitudinal surface; separate means arranged in said recess and engaging the other of said end faces for locating said bit longitudinally of said recess; and separate means engaging said clamping surface and one of said pair of side faces for clamping said bit in said recess.

6. In a turning tool, the combination comprising an indexible and reversible prismatic cutting bit and a holder therefor; said bit having equilateral triangular end faces connected by elongated rectangular primary side faces defining primary included angles on said end faces, a pair of said primary side faces severally being cut away an equal amount along their juncture to form a pair of secondary side faces defining a cutting edge located on the perpendicular bisector of the remaining one of said primary side faces and extending from one to the other of said end faces and secondary included angles on said end faces greater than the corresponding ones of said primary angles, for varying the effective side clearance and top rake angles for said holder; said holder comprising an elongated bit supporting body of generally polygonal cross section including an offset end portion having a base, and lateral front and rear surfaces connected by a longitudinal side surface, said end portion being cut away to form a bit receiving recess of uniform V-shaped cross section and a bit clamping surface, said recess being defined by two bit back-up surfaces extending longitudinally of said body from said front surface to said rear surface and intersecting along a juncture line, said clamping surface extending longitudinally of said body from said front surface parallel to said juncture line and laterally of said body to one of said back-up surfaces at an obtuse included angle with said one back-up surface, the other of said back-up surfaces extending laterally of said body to said longitudinal surface and making an acute included angle with said base; said bit being arranged in said recess with either one of said end faces extending transversely of said recess adjacent said front surface, the remaining one of said primary side faces supported by said one back-up surface, and said cutting edge adjacent the juncture of said other back-up surface and said longitudinal surface; separate means arranged in said recess and engaging either one of said end faces for locating said bit longitudinally of said recess; and separate means engaging said clamping surface and either one of said pair of side faces for clamping said bit in said recess.

7. In a turning tool, the combination comprising an indexible prismatic cutting bit and a holder therefor; said bit having equilateral triangular end faces connected by elongated rectangular side faces defining primary included angles on said end faces, all of said side faces severally being cut away along their junctures to define cutting edges extending from one toward the other of said end faces and secondary included angles on said one end face greater than the corresponding ones of said primary angles, for varying the effective side clearance and/or top rake angles for said holder; said holder comprising an elongated bit supporting body of generally polygonal cross section including a base, a side, and an offset end portion having lateral front and rear surfaces connected by a longitudinal surface, said front surface making an obtuse included angle with said side and said base and a right included angle with said longitudinal surface, said end portion being cut away to form a bit receiving recess of uniform V-shaped cross section and a bit clamping surface, said recess being defined by two bit back-up surfaces extending longitudinally of said body from said front surface to said rear surface and intersecting along a juncture line parallel to said longitudinal surface, said clamping surface extending longitudinally of said body from said front surface parallel to said juncture line and laterally of said body to one of said back-up surfaces at an obtuse included angle with said one back-up surface which makes an acute included angle with said base, and the other of said back-up surfaces extending laterally of said body to said longitudinal surface and making an acute included angle with said base; said bit being arranged in said recess with said one end face extending transversely of said recess adjacent said front surface, any one of said side faces supported by said one back-up surface, and any one of said cutting edges adjacent the juncture of said other back-up surface and said longitudinal surface; separate means arranged in said recess and engaging the other of said end faces for locating said bit longitudinally of said recess; and separate means engaging said clamping surface and any one of said side faces for clamping said bit in said recess.

8. In a turning tool, the combination comprising an indexible and reversible prismatic cutting bit and a holder therefor; said bit having equilateral triangular end faces connected by elongated rectangular primary side faces defining primary included angles on said end faces, all of said side faces severally being cut away an equal amount along their junctures to form pairs of secondary side faces defining cutting edges severally located on the perpendicular bisectors of the opposite ones of said primary side faces and extending from one to the other of said end faces and secondary included angles on said end faces greater than the corresponding ones of said primary angles, for varying the effective side clearance and top rake angles for said holder; said holder comprising an elongated bit supporting body of generally polygonal cross-section including a base, a side, and an offset end portion having lateral front and rear surfaces connected by a longitudinal side surface, said front surface making an obtuse included angle with said side and said base and a right included angle with said longitudinal surface, said end portion being cut away to form a bit receiving recess of uniform V-shaped cross section and a bit clamping surface, said recess being defined by two bit back-up surfaces extending longitudinally of said body from said front surface to said rear surface and intersecting along a juncture line parallel to said longitudinal surface and perpendicular to said front surface, said clamping surface extending longitudinally of said body from said front surface parallel to said juncture line and laterally of said body from said side to one of said back-up surfaces at an obtuse included angle with said one back-up surface which makes an acute included angle with said base, and the other of said back-up surfaces extending laterally of said body to said longitudinal surface and making an acute included angle with said base greater than said included angle between said one back-up surface and said base; said bit being arranged in said recess with either one of said end faces extending transversely of said recess adjacent said front surface, any one of said side faces supported by said one back-up surface, and any one of said cutting edges adjacent the juncture of said other back-up surface and said lognitudinal surface; separate means arranged in said recess and engaging either one of said end faces for locating said bit longitudinally of said recess; and separate means engaging said clamping surface and any one of said side faces for clamping said bit in said recess.

(References on following page)

References Cited by the Examiner

UNITED STATES PATENTS

| | | | |
|---|---|---|---|
| 1,496,984 | 6/24 | Felsch | 29—96 |
| 2,160,369 | 5/39 | Rikof | 29—96 |
| 2,414,811 | 1/47 | Hollis | 29—96 |
| 2,737,705 | 3/56 | Novkov | 29—96 |
| 2,838,827 | 5/58 | Wright | 29—96 |
| 2,860,402 | 11/58 | Proksa | 29—96 |
| 2,883,737 | 4/59 | Wilson | 29—96 |
| 2,912,744 | 11/59 | Proksa | 29—96 |
| 2,922,219 | 1/60 | Scott | 29—96 |
| 3,052,952 | 9/62 | Bader et al. | 29—96 |

FOREIGN PATENTS 1,260,357  3/61  France.

WILLIAM W. DYER, Jr., *Primary Examiner.*

FRANK H. BRONAUGH, *Examiner.*